(12) United States Patent
Choi et al.

(10) Patent No.: US 6,506,818 B1
(45) Date of Patent: Jan. 14, 2003

(54) POLYESTER RESIN COMPOSITIONS FOR FILM

(75) Inventors: Wooseok Choi, Taegu (KR); Sangbong Park, Kumi (KR)

(73) Assignee: Kolon Industries, Inc., Kyunggi-do (KR)

( * ) Notice: Subject to any disclaimer, the term of this patent is extended or adjusted under 35 U.S.C. 154(b) by 0 days.

(21) Appl. No.: 09/716,407

(22) Filed: Nov. 21, 2000

(30) Foreign Application Priority Data

Dec. 20, 1999 (KR) ............................................. 99-59338
Sep. 20, 2000 (KR) ............................................. 00-55094

(51) Int. Cl.⁷ ............................ C08K 3/34; C08K 9/10; C08K 3/20; C08K 67/00
(52) U.S. Cl. ........................ 523/210; 524/493; 524/601
(58) Field of Search ................... 523/210, 201; 524/399, 492, 493, 601, 431, 434, 435, 436

(56) References Cited

U.S. PATENT DOCUMENTS

| | | | |
|---|---|---|---|
| 4,173,622 A | * 11/1979 | Robertson | .................. 423/709 |
| 4,460,671 A |   7/1984 | Yasuda et al. | ................ 430/98 |
| 4,584,330 A | * 4/1986 | Wason | ........................ 523/513 |
| 5,563,200 A |  10/1996 | Daly et al. | ................... 524/423 |
| 5,935,700 A | * 8/1999 | Enomoto et al. | ........... 428/330 |
| 5,948,525 A | * 9/1999 | Kimura et al. | .............. 428/339 |

FOREIGN PATENT DOCUMENTS

| | | |
|---|---|---|
| EP |    269341   |   1/1988 |
| EP |    254773   | * 2/1988 |
| EP |    345644   | * 12/1989 |
| EP |    377507   |  11/1990 |
| EP |    765912   | * 4/1997 |
| JP |  60-179931  |   9/1985 |
| JP |   1-311131  |  12/1989 |
| JP |   2-214734  |   8/1990 |
| JP |   8-134332  |   5/1996 |

* cited by examiner

Primary Examiner—Vasu Jagannathan
Assistant Examiner—Callie E. Shosho
(74) Attorney, Agent, or Firm—Shanks & Herbert

(57) ABSTRACT

The polyester composition for films includes, based on 100 parts by weight of a polyester resin, 0.01 to 5 parts by weight of aluminum silicate particles containing aluminum and silica as principal components and an alkali metal. To provide polyester films suitable for magnetic recording media, the polymer composition contains surface- modified aluminum silicate particles and two additional particles distinct in particle diameter. The polyester films thus obtained have excellent abrasion resistance and scratch resistance.

8 Claims, 1 Drawing Sheet

POLYESTER RESIN COMPOSITIONS FOR FILM

This application claims priority to Korean Patent Application No. 99-59338, filed on Dec. 20, 1999; and

BACKGROUND OF THE INVENTION

1. Field of the Invention

The present invention generally relates to a polyester composition for films and, ore particularly, to a polyester composition suitable for films excellent in abrasion resistance and slipping property without formation of large projections

2. Description of the Related Art

Generally, thermoplastic polyesters, for example, polyethylene terephthalate have excellent physical and chemical properties and are broadly used as fiber, film and other formed articles. Among these formed articles, films are widely used for magnetic recording media.

In the manufacture of polyester films, certain particles are dispersed in the polyester composition to provide an uneven surface and thereby improve the slipping property of the films lest that lacking of the slipping property should lead to a deterioration of productivity. For that reason, the technique for dispersing particles is a critical factor in the polyester composition for films.

Especially, those particles used in the polyester films for magnetic recording media are required not to form large projections or agglomerates on the surface of the films that may otherwise cause exfoliation of the material of the magnetic recording media. Thus the particles must have such excellent dispersability in the composition of polyester films for magnetic recording media as to prevent formation of agglomerates.

Besides, polyester films are ready to generate abrasion dusts or scratches on their surface when running during the manufacture or other processes. This causes, particularly in the case of polyester films for magnet recording media, a sudden deterioration of the performance and hence the quality of the magnet recording media.

From the viewpoint of the above problems, the polyester composition for films should meet the following requirements:

(1) The particles contained in the composition have not to form agglomerates; and
(2) The polyester composition has to guarantee excellent abrasion resistance and scratch resistance of the films produce therefrom.

In an attempt to improve the slipping property of the polyester film, for example, Japanese Patent Laid-Open (Sho) No. 60-179931 discloses a polyester film for magnetic tapes, which contains 0.01 to 1.0 wt. % of calcium carbonate particles with an average particle diameter of 0.01 to 0.39 $\mu$m, and 0.005 to 0.2 wt. % of another calcium carbonate particles with an average particle diameter of 0.40 to 1.0 $\mu$m.

Japanese Patent Laid-Open (Pyung) No. 2-214734 discloses a biaxially oriented polyester film with improved abrasion resistance and scratch resistance, which contains 0.1 to 2 wt. % of particles (A) with an average particle diameter of 5 to 400 nm, and 0.01 to 0.4 wt. % of particles (B) with an average particle diameter of 400 to 1,500 nm, the particles A and B being independently selected from the group consisting of α-alumina, γ-alumina, δ-alumina, zirconia, titanium oxide, and organic polymers.

Japanese Patent Laid-Open (Pyung) No. 1-311131 discloses a polyester film with improved abrasion resistance and scratch resistance, which contains inert inorganic particles (A) with a Mohs hardness of more than 6 and inorganic particles (B) with an average particle diameter larger than that of the particles (A) and which exhibits an ultimate viscosity in the range from 0.52 to 0.62.

Further, Japanese Patent Laid-Open (Pyung) No. 8-134332 discloses a polyester film with improved abrasion resistance and scratch resistance which contains aluminum silicate particles and two additional particles (A) and (B), wherein particles (A) have a Mohs hardness of more than 6 and particles (B) have a Mohs hardness of less than 4.

In the light of recent tendencies of magnetic recording media, i.e., high recording density and high speed, the above-described conventional methods could not meet the requirements for quality of the films for magnetic recording media in regard to slipping property so that there is an increase in the risk of the generation of white powder to cause more frequent occurrence of dropout on the video tapes.

Especially, the larger quantity of particles in the composition, the more agglomeration of those which cause dropout on the video tapes, so it is strongly demanded to solve these problems.

SUMMARY OF THE INVENTION

To provide a polyester composition suitable for polyester films, the present invention uses aluminum silicate particles whose terminals are modified to enhance dispersability, abrasion resistance and scratch resistance, and further particles A with a Mohs hardness of more than 5 and particles B with a Mohs hardness of less than 4 to increase the abrasion resistance and scratch resistance of the polyester film.

It is therefore an object of the present invention to provide a polyester composition suitable for films lacking of large projections and excellent in both abrasion resistance and slipping property.

To achieve the above object, there is provided a polyester resin composition for films characterized in that the polyester composition comprises, based on 100 parts by weight of a polyester resin, 0.01 to 5 parts by weight of aluminum silicate particles containing aluminum and silica as principal components and an alkali metal.

DETAILED DESCRIPTION OF THE INVENTION

Figure 1:
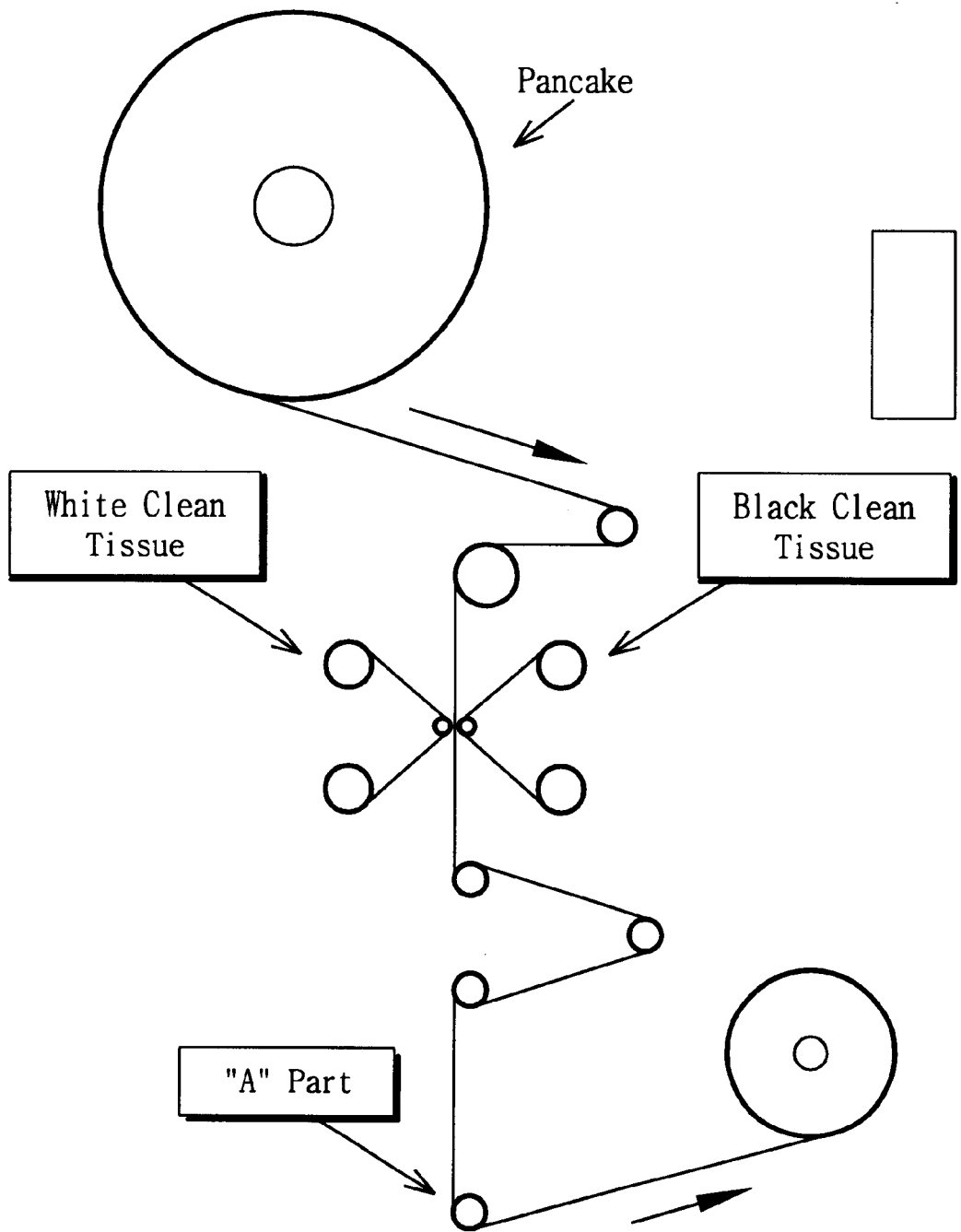
FIG. 1 is a plan view showing a running test system for testing abrasion resistance of films in accordance with the present invention.

A polyester composition using aluminum silicate particles and a polyester film prepared from the same have been proposed in Japanese Patent Laid-Open (Pyung) No. 8-134332. A use of the aluminum silicate particles may guarantee good abrasion resistance and scratch resistance, but the problem with poor dispersability of particles remains unsolved with the result of a deterioration of the filterability required in the manufacturing process of the films. Furthermore, large projections are generated on the surface of the film to cause dropout of the magnetic recording media.

Accordingly, the present invention deals with the intrinsic problem with the aluminum silicate particles and modifies the surface of the aluminum silicate particles to overcome the above problem relating agglomeration of the particles.

Hereinafter, a detailed description will be given below to the modified aluminum silicate particles used in the present invention.

The outer layer of the aluminum silicate particles has chemical bonds as shown in the chemical formula 1.

[Chemical Formula 1]

As shown in the formula, the surface of the aluminum silicate particles has negative electric charges. Although not so strong at the Si—O⁻ terminal, the strength of the negative charge is considerably strong at the Al—O⁻ terminal. This high strength of the negative charges guarantees an interaction between the aluminum silicate particles and the other additional materials and particles with other properties, in particular, a metal catalyst and a thermal stabilizer used in the preparation of the polyester composition, thereby increasing the possibility of agglomeration of the particles.

This problem is overcome in the present invention with a use of aluminum silicate particles whose terminal of Al—O⁻ is modified with an alkali metal substituent in the form of Al—O⁻M⁺ in order to lower the strength of the negative charges on the surface of the outer layer.

The aluminum silicate particles with alkali metal substituents as used in the present invention contain aluminum and silica as principal inorganic components, and an alkali metal. There is no particular limitation on the type of the alkali metal.

The aluminum silicate particles used in the present invention have an average particle diameter in the range from 0.01 μm to 2.0 μm. With an extremely small average particle diameter of less than 0.01 μm, the particles have no effect on the composition. With an average particle diameter of more than 2.0 μm, there may be a possibility that the coarse particles protrude from the surface of the outer layer.

The aluminum silicate particles can have the alkali metal ion as the shape of counterion with the terminal anion.

The aluminum silicate particles preferably have a mole ratio of silica to aluminum in the range from 0.25 to 10 and a mole ratio of aluminum to alkali metal atoms in the range from 1.0 to 2.0. The higher proportion of the alkali metal may incur more side reactions during the polymerization reaction of polyester with the undesirable result of a sharp increase in the b-value and acid number of the polyester. The lower proportion of the alkali metal is inadequate so that the strength of the terminal negative ion of the aluminum silicate particles cannot be lowered and the particles form agglomerates.

The aluminum silicate particles having an alkali metal substituent at the terminal can be prepared by, if not limited to, by adding an alkali metal silicate or ammonium silicate and an alkali-soluble aluminum compound to an aqueous alkaline solution to generate colloidal particles.

Alternatively, in order to suppress the possible occurrence of side reactions in the polyester composition by the effect of the alkali metal used for the aluminum silicate particles, other particles can be used as seed grains so as to replace the aluminum silicate particles having terminal alkali substituents with another aluminum silicate particles grown from the seed grains used as nucleuses.

Preferably, the aluminum silicate particles with a core-shell structure grown from the seed grains as nucleuses is formed by, if not limited to, adding both a silicate of alkali metal, ammonium or organic base and an alkali-soluble aluminum compound to a disperse solution of the seed grain with a pH value of more than 9 to control the pH value of the disperse solution and allow grain growth using the seed grain as a nucleus.

Examples of the seed grains include, if not limited to, silica, alumina, zirconia, titanium oxide, ferric oxide, antimony oxide, indium oxide and cerium oxide. The aluminum silicate particles thus obtained by the grain growth have a volume average particle diameter in the range of 0.01 to 2.0 μm.

The aluminum silicate particles having a core-shell structure have a weight ratio of core to shell in the range from 0.25 to 10 and a mole ratio of aluminum to alkali metal atoms in the range from 1.0 to 2.0.

The aluminum silicate particles as used in the present invention may be subjected to a pretreatment prior to the addition stage unless the pretreatment should suppress the effects of the invention. The pretreatment includes, for example, (1) adding an anionic surfactant such as sodium dodecyl benzene sulfonate, sodium lauryl sulfate, or condensates of naphthalene sulfonate with formalin; a non-ionic surfactant such as polyoxyphenol ether, or polyethylene glycol monostearate; a water-soluble synthetic polymer such as polyvinyl alcohol, polyvinyl pyrrolidone, or polyethylene glycol; a water-soluble natural polymer such as gelatin or starch; or a water-soluble semi-synthetic polymer such as carboxymethyl cellulose; (2) surface-treating with a silane- or titanium-based coupling agent; or (3) other processes including particle dispersion, classification and removal of agglomeraters.

The polyester resin composition of the present invention comprises, based on 100 parts by weight of the polyester resin, 0.01 to 5 parts by weight of the aluminum silicate particles with a terminal alkali metal substituent or a core-shell structure in the polyester resin which contains dicarboxylic acids and their esters and alkylene glycols as principal components and which is capable of copolymerization with a 2,6-naphthalate structure.

With less than 0.01 parts by weight of the aluminum silicate particles based on 100 parts by weight of the polyester resin, the resulting film scarcely has abrasion resistance or scratch resistance. With more than 5 parts by weight of the aluminum silicate particles, the content of the alkali metal is increased in the preparation of the composition and has an adverse effect on the acid number and b-value of the composition.

In addition to the aluminum silicate particles, the polyester resin composition of the present invention comprise, based on 100 parts by weight of the polyester resin, 0.05 to 5 parts by weight of particles (A) having a volume average particle diameter of 0.005 to 1.0 μm, a difference in the average particle size from the aluminum silicate particles in the range of 0.05 to 0.2 μm and a Mohs hardness of greater than 5, and 0.05 to 5 parts by weight of particles (B) having a volume average particle diameter of 0.05 to 2.0 μm, a difference in the average particle size from the aluminum silicate particles in the range of less than 1.0 μm and a Mohs hardness of less than 4. This polyester resin can be used in combination with the polyester resin containing the aluminum silicate particles to improve the abrasion resistance and scratch resistance of the resulting film.

With an amount of the particles (A) or (B) being less than 0.05 parts by weight based on 100 parts by weight of the polyester resin, the effects of the particles (A) and (B) become negligible. With more than 5 parts by weight of the particles A or B, the particle content increases with the result of agglomeration of particles.

Examples of the particles (A) include, if not limited to, silica, spherical silica, titanium oxide, zirconia oxide, alumina, and ferric oxide. And, there is no particular limitation on the preparation method or type of the particles A.

Examples of the particles (B) include, if not limited to, inorganic particles such as caolinite, calcium carbonate, barium carbonate, calcium sulfate, barium sulfate and zinc sulfate, or crosslinked polymer fine particles, and may be preferably calcium carbonate with the view to improving the abrasion resistance of the films. There is no particular limitation on the type of calcium carbonate, for example, either hard calcium carbonate or heavy calcium carbonate and on the particle form of the calcium carbonate. Preferably, the calcium carbonate particles have an almost granule or spheroidal spherical form or a cubic form that guarantees dispersion of the particles in the film, prevents exfoliation of particles and improves slipping property. The crosslinked polymer fine particles have a degree of crosslinking 5 to 70% and specifically include thermosetting resins such as vinyl, acryl, styrene copolymer, crosslinked ester, crosslinked amide, amide resin, phenol resin, epoxy resin, urea resin, benzoguanamine resin, fluorine resin or melamine resin, and silicon or urethane rubbers. The crosslinked polymer fine particles contain chemically inactive carboxyl or hydroxyl groups or have a porous structure.

On the other hand, the principal component of the present invention, namely, polyester resin is prepared by condensation reaction of a dicarboxylic acid component with a glycol component. The dicarboxylic acid component specifically includes terephthalic acid, naphthalene dicarboxylic acid and esters thereof and may be copolymerized with a small quantity of isophthalic acid, phthalic acid, adipic acid, and esters thereof. The glycol component is an ethylene glycol and may be copolymerized with a small quantity of propylene glycol, butanediol, 1,4-cyclohexanedimethanol or neopentylglycol.

The polyester resin in the present invention optionally comprises a proper amount of thermal stabilizer, UV stabilizer, antioxidant, dye, antistatic agent, etc. and may be copolymerized with them.

A use of either magnesium compound or calcium compound, or both of them in addition to a manganese compound in the preparation of the polyester resin guarantees the transparency and heat resistance of the polymer and a good contact between the casting drum and the polymer solution in formation of layers by the electrostatic-applied cooling method.

Preferably, the present invention undergoes to known processes including particle dispersion, classification and removal of agglomerizers. There is no particular limitation on the processing method and conditions, the type of the substrate, or the processing time.

To improve cohesion between ethylene glycols or polymers and particles, the present invention can also be subjected to a surface treatment or dispersion treatment with acryl copolymer with inorganic particles, other carboxylic acids, polymers thereof, metal salts, alkyl salts, phosphor compounds, silane- or titanium-based coupling agents, sulfonic acid compounds or copolymers thereof, or metal salts thereof alone or in combination of more than two of them.

The particles of the present invention are preferably added, if not limited to, in a dispersed form in the glycol component. There is no particular limitation on the time for adding the particles as long as the time is prior to the beginning of the polycondensation, and the particles are preferably added after the substantial completion of the esterification or ester exchange reaction in viewpoint of the object of the invention. Furthermore, the layers can be formed from, if not limited to, a polyester composition containing more than two distinct particles or multiple distinct polyester compositions each containing single particles after blend extrusion at a controlled concentration.

Hereinafter, a detailed description will be given below to a polyester resin composition for films by way of examples, which are not intended to limit the scope of the invention.

The term "part" as used in the following examples means "part by weight".

PREPARATION EXAMPLE 1

Preparation of Aluminum Silicate Particles having an Alkali Metal Substituent at Terminals 1.5 part of an aqueous sodium silicate solution and 0.5 part of an aqueous sodium aluminate were added at a constant temperature of 80° C. for about 20 hours and grown into colloidal particles, i.e., aluminum silicate particles with an average particle diameter 0.10 μm and 0.15 μm, respectively. A mole ratio of silicate to alumina obtained above described procedures is 1.51 and that of alumina to sodium is 1.16.

PREPARATION EXAMPLE 2

Preparation of Aluminum Silicate Particles having a Core-shell Structure 53 parts of sodium hydroxide was added to a mixed solution of a disperse solution of silica (average particle diameter of 0.05 μm and particle concentration of 20%) with the pH value of more than 9 and purified water so as to control the pH value at 12.5. The mixture was then heated to 80° C. Subsequently, 1.5 part of an aqueous sodium silicate solution for the silica in the disperse solution and 0.5 part of an aqueous sodium aluminate for aluminum oxide were added in a simultaneous manner for 20 hours, while maintaining the temperature at 80° C. After the completion of the addition, the reaction solution was stirred for 1 hour, cooled to the room temperature and filtered to yield an aqueous colloidal disperse solution having a particle concentration of 20 parts. Then, the water in the aqueous disperse solution was substituted with an ethylene glycol to obtain an ethylene glycol disperse solution containing aluminum silicate particles (average particle diameter: 0.10 μm) having a core-shell structure. A mole ratio of silicate to alumina obtained above described procedures is 2.40 and that of alumina to sodium is 1.02.

PREPARATION EXAMPLE 3

To an ester exchange reactor were added 100 parts of dimethylterephthalate, 60 parts of ethylene glycol, 0.1 part of magnesium acetate tetrahydrate and 0.05 part of antimony oxide. The reaction mixture was then subjected to ester exchange reaction for 4 hours until the temperature reached 230° C., while removing methanol out of the reactor from 140° C. After adding 0.05 part of trimethylphosphate and then 1.0 part of the aluminum silicate particles with an average particle diameter of 0.10 μm as obtained in Preparation Example 1, the reaction mixture was transferred to a polycondensation reactor and subjected to polycondensation under high vacuum for 4 hours to yield a polyethylene terephthalate (PET) (A) having an intrinsic viscosity of 0.610.

PREPARATION EXAMPLE 4

The procedures were preformed in the same manner as described in Preparation Example 3, excepting that 1.0 part of the aluminum silicate particles with an average particle diameter of 0.15 μm as obtained in Preparation Example 1 were used to yield a polyethylene terephthalate (PET) (B).

PREPARATION EXAMPLE 5

The procedures were preformed in the same manner as described in Preparation Example 3, excepting that 1.0 part of silica particles with an average particle diameter of 0.05 μm were used instead of the aluminum silicate particles to yield a polyethylene terephthalate (PET) (C) having an intrinsic viscosity of 0.610.

PREPARATION EXAMPLE 6

The procedures were preformed in the same manner as described in Preparation Example 3, excepting that 1.0 part of alumina particles with an average particle diameter of 0.05 μm were used instead of the aluminum silicate particles to yield a polyethylene terephthalate (PET) (D) having an intrinsic viscosity of 0.610.

PREPARATION EXAMPLE 7

The procedures were preformed in the same manner as described in Preparation Example 3, excepting that 1.0 part of calcium carbonate particles with an average particle diameter of 0.60 μm were used instead of the aluminum silicate particles to yield a polyethylene terephthalate (PET) (E) having an intrinsic viscosity of 0.610.

PREPARATION EXAMPLE 8

To an ester exchange reactor were added 100 parts of dimethylterephthalate, 60 parts of ethylene glycol, 0.1 part of magnesium acetate tetrahydrate, 0.05 part of antimony oxide and 0.4 part of silica particles having an average particle diameter of 0.05 μm. The reaction mixture was then subjected to ester exchange reaction for 4 hours until the temperature reached 230° C., while removing methanol out of the reactor from 140° C. To the reaction mixture were added 0.05 part of trimethylphosphate and 0.2 part of the aluminum silicate particles with an average particle diameter of 0.10 μm as obtained in Preparation Example 1. After about 20 minutes, 1.2 part of calcium carbonate particles with an average particle diameter of 0.60 μm were added. The reaction mixture was then transferred to a polycondensation reactor and subjected to polycondensation under high vacuum for 4 hours to yield a polyethylene terephthalate (PET) (F) having an intrinsic viscosity of 0.610.

PREPARATION EXAMPLE 9

To an ester exchange reactor were added 100 parts of dimethylterephthalate, 60 parts of ethylene glycol, 0.1 part of magnesium acetate tetrahydrate, 0.05 part of antimony oxide and 0.4 part of silica particles having an average particle diameter of 0.05 μm. The reaction mixture was then subjected to ester exchange reaction for 4 hours until the temperature reached 230° C., while removing methanol out of the reactor from 140° C. To the reaction mixture were added 0.05 part of trimethylphosphate and 0.2 part of the aluminum silicate particles with an average particle diameter of 0.15 μm as obtained in Preparation Example 1. After about 20 minutes, 1.2 part of calcium carbonate particles with an average particle diameter of 0.60 μm were added. The reaction mixture was then transferred to a polycondensation reactor and subjected to polycondensation under high vacuum for 4 hours to yield a polyethylene terephthalate (PET) (G) having an intrinsic viscosity of 0.610.

PREPARATION EXAMPLE 10

To an ester exchange reactor were added 100 parts of dimethylterephthalate, 60 parts of ethylene glycol, 0.1 part of magnesium acetate tetrahydrate, 0.05 part of antimony oxide and 0.4 part of alumina particles having an average particle diameter of 0.05 μm. The reaction mixture was then subjected to ester exchange reaction for 4 hours until the temperature reached 230° C., while removing methanol out of the reactor from 140° C. To the reaction mixture were added 0.05 part of trimethylphosphate and 0.2 part of the aluminum silicate particles with an average particle diameter of 0.10 μm as obtained in Preparation Example 1. After about 20 minutes, 1.2 part of calcium carbonate particles with an average particle diameter of 0.60 μm were added. The reaction mixture was then transferred to a polycondensation reactor and subjected to polycondensation under high vacuum for 4 hours to yield a polyethylene terephthalate (PET) (H) having an intrinsic viscosity of 0.610.

PREPARATION EXAMPLE 11

To an ester exchange reactor were added 100 parts of dimethylterephthalate, 60 parts of ethylene glycol, 0.1 part of magnesium acetate tetrahydrate, 0.05 part of antimony oxide and 0.4 part of alumina particles having an average particle diameter of 0.05 μm. The reaction mixture was then subjected to ester exchange reaction for 4 hours until the temperature reached 230° C., while removing methanol out of the reactor from 140° C. To the reaction mixture were added 0.05 part of trimethylphosphate and 0.2 part of the aluminum silicate particles with an average particle diameter of 0.15 μm as obtained in Preparation Example 1. After about 20 minutes, 1.2 part of calcium carbonate particles with an average particle diameter of 0.60 μm were added. The reaction mixture was then transferred to a polycondensation reactor and subjected to polycondensation under high vacuum for 4 hours to yield a polyethylene terephthalate (PET) (I) having an intrinsic viscosity of 0.610.

PREPARATION EXAMPLE 12

To an ester exchange reactor were added 100 parts of dimethylterephthalate, 60 parts of ethylene glycol, 0.1 part of magnesium acetate tetrahydrate, 005 part of antimony oxide and 0.5 part of silica particles having an average particle diameter of 0.05 μm. The reaction mixture was then subjected to ester exchange reaction for 4 hours until the temperature reached 230° C., while removing methanol out of the reactor from 140° C.

After adding 0.05 part of trimethylphosphate and 1.2 part of calcium carbonate particles with an average particle diameter of 0.60 μm, the reaction mixture was transferred to a polycondensation reactor and subjected to polycondensation under high vacuum for 4 hours to yield a polyethylene terephthalate (PET) (J) having an intrinsic viscosity of 0.610.

PREPARATION EXAMPLE 13

To an ester exchange reactor were added 100 parts of dimethylterephthalate, 60 parts of ethylene glycol, 0.1 part of magnesium acetate tetrahydrate, 0.05 part of antimony oxide and 0.4 part of alumina particles having an average particle diameter of 0.05 μm. The reaction mixture was then subjected to ester exchange reaction for 4 hours until the temperature reached 230° C., while removing methanol out of the reactor from 140° C. After adding 0.05 part of trimethylphosphate and 1.2 part of calcium carbonate particles with an average particle diameter of 0.60 μm, the reaction mixture was transferred to a polycondensation reactor and subjected to polycondensation under high vacuum for 4 hours to yield a polyethylene terephthalate (PET) (K) having an intrinsic viscosity of 0.610.

PREPARATION EXAMPLE 14

The procedures were performed in the same manner as described in Preparation Example 3, excepting that no particle was added to yield a polyethylene terephthalate (PET) (L) having an intrinsic viscosity of 0.620.

PREPARATION EXAMPLE 15

The procedures were preformed in the same manner as described in Preparation Example 3, excepting that 1.0 part of aluminum silicate particles grown from the seed grains obtained in Preparation Example 2 were used instead of the aluminum silicate particles obtained in Preparation Example 1 to yield a polyethylene terephthalate (PET) (M).

The polyethylene terephthalate compositions obtained in Preparation Examples 3 to 15 were blended together at a mixing ratio as stated in the following examples and comparative examples. After dried at 160° C. the mixture was extruded at 300° C. and processed into an amorphous sheet by the electrostatic-applied cooling method. The sheet thus obtained was stretched to 3.5 times the original dimension in the axial direction at 100° C. and 3.8 times in the transverse direction at 110° C. The stretched sheet was then processed into a biaxially stretched film through crystallization at 220° C. and relaxation 20 of 3%.

EXAMPLE 1

The polyethylene terephthalate compositions (A), (C), (E) and (L) as obtained in the preparation examples were blended at a mixing ratio of 1:1.5:3.5:4.0 and processed in the above-described procedures to produce a film having a thickness of 14.5 μm.

EXAMPLE 2

The polyethylene terephthalate compositions (B), (C), (E) and (L) as obtained in the preparation examples were blended at a mixing ratio of 1:1.5:3.5:4.0 and processed in the above-described procedures to produce a film having a thickness of 14.0 μm.

EXAMPLE 3

The polyethylene terephthalate compositions (A), (D), (E) and (L) as obtained in the preparation examples were blended at a mixing ratio of 1:1.5:3.5:4.0 and processed in the above-described procedures to produce a film having a thickness of 14.3 μm.

EXAMPLE 4

The polyethylene terephthalate compositions (B), (D), (E) and (L) as obtained in the preparation examples were blended at a mixing ratio of 1:1.5:3.5:4.0 and processed in the above-described procedures to produce a film having a thickness of 14.5 μm.

EXAMPLE 5

The polyethylene terephthalate compositions (F) and (L) as obtained in the preparation examples were blended at a mixing ratio of 1:1 and processed in the above-described procedures to produce a film having a thickness of 15.0 μm.

EXAMPLE 6

The polyethylene terephthalate compositions (G) and (L) as obtained in the preparation examples were blended at a mixing ratio of 1:1 and processed in the above-described procedures to produce a film having a thickness of 14.8 μm.

EXAMPLE 7

The polyethylene terephthalate compositions (H) and (L) as obtained in the preparation examples were blended at a mixing ratio of 1:1 and processed in the above-described procedures to produce a film having a thickness of 14.7 μm.

EXAMPLE 8

The polyethylene terephthalate compositions (I) and (L) as obtained in the preparation examples were blended at a mixing ratio of 1:1 and processed in the above-described procedures to produce a film having a thickness of 14.8 μm.

EXAMPLE 9

The polyethylene terephthalate compositions (M), (C), (E) and (L) as obtained in the preparation examples were blended at a mixing ratio of 1:1.5:3.5:4.0 and processed in the above-described procedures to produce a film having a thickness of 14.6 μm.

COMPARATIVE EXAMPLE 1

The polyethylene terephthalate compositions (C), (F) and (L) as obtained in the preparation examples were blended at a mixing ratio of 1.5:3.5:5.0 and processed in the above-described procedures to produce a film having a thickness of 14.5 μm.

COMPARATIVE EXAMPLE 2

The polyethylene terephthalate compositions (D), (E) and (L) as obtained in the reparation examples were blended at a mixing ratio of 1.5:3.5:5.0 and processed in the above-described procedures to produce a film having a thickness of 14.9 μm.

COMPARATIVE EXAMPLE 3

The polyethylene terephthalate compositions (J) and (L) as obtained in the preparation examples were blended at a mixing ratio of 1:1 and processed in the above-described procedures to produce a film having a thickness of 15.0 μm.

COMPARATIVE EXAMPLE 4

The polyethylene terephthalate compositions (K) and (L) as obtained in the preparation examples were blended at a mixing ratio of 1:1 and processed in the above-described procedures to produce a film having a thickness of 14.5 μm.

Subsequently, the films obtained in the examples and comparative examples were evaluated for content, particle size and properties, which are presented in Tables 1—1 and 1–2. The properties of the films were determined in the following procedures:

(1) Average particle diameter and particle size distribution

For calcium carbonate particles, the particle size distribution was evaluated with a particle size distribution analyzer (model SA-CP3 supplied by Shimazu Corporation) and the average particle diameter was measured on the basis of a 50 mass percent ($d_{50}$) in an equivalent cumulative curve of spherical particles.

Aluminum silicate, silica and alumina particles were measured for particle size with a particle size distribution analyzer (model NICOMP-370 supplied by Hiac/Royco Corporation) using the laser light scattering method.

(2) Element mole ratio analyses of alumina, silica and sodium Element analyses of alumina, silicate, and sodium were measured by STS-1200AR(Seiko, Japan), and then calculated mole ratio of thereof with molecular weight.

(3) Abrasion resistance of films

In a running test system shown in FIG. 1, equipped with a 6 mm-diameter film guide pin made of stainless steel ("A" part), a 200 m long film was allowed to run at a rate of 250 m/minute under a running tension of 50 g. Thereafter, the abrasion resistance of the film was graded as follows by the amount of chipped white powder on the fixed guide pin:

Grade 1: No white powder was found.

Grade 3: White powder was slightly found.

Grade 5: White powder was heavily found.

The grade of the film was determined on the average after ten times of the running test. Grade 2 was a medium between Grades 1 and 3, grade 4 being a medium between Grades 3 and 5. Grades 4 and 5 were rejected.

(4) Scratch resistance of films

A film was allowed to run in a video decoder reciprocally 100 times. Thereafter, the film was cut into pieces and observed for scratches with a reflecting microscope.

Grade 1: No scratch was found.

Grade 3: A few scratches were found.

Grade 5: Many scratches were found.

The grade of the film was determined on the average after ten times of running test. Grade 2 was a medium between Grades 1 and 3, grade 4 being a medium between Grades 3 and 5. Grades 4 and 5 were rejected.

TABLE 1-1

| | Aluminum Silicate Particle | | Particle A | | |
|---|---|---|---|---|---|
| | Average Particle Diameter ($\mu$m) | Content (Part) | Type | Average Particle Diameter ($\mu$m) | Content (Part) |
| Example 1 | 0.10 | 0.10 | Silica | 0.05 | 0.15 |
| Example 2 | 0.15 | 0.10 | Silica | 0.05 | 0.15 |
| Example 3 | 0.10 | 0.41 | Alumina | 0.05 | 0.15 |
| Example 4 | 0.15 | 0.10 | Alumina | 0.05 | 0.15 |
| Example 5 | 0.10 | 0.10 | Silica | 0.05 | 0.20 |
| Example 6 | 0.15 | 0.10 | Silica | 0.05 | 0.20 |
| Example 7 | 0.10 | 0.10 | Alumina | 0.05 | 0.20 |
| Example 8 | 0.15 | 0.10 | Alumina | 0.05 | 0.20 |
| Example 9 | 0.10 | 0.10 | Silica | 0.05 | 0.15 |
| Comparative Example 1 | — | — | Silica | 0.05 | 0.15 |
| Comparative Example 2 | — | — | Alumina | 0.05 | 0.15 |
| Comparative Example 3 | — | — | Silica | 0.05 | 0.20 |
| Comparative Example 4 | — | — | Alumina | 0.05 | 0.20 |

TABLE 1-2

| | Particle B | | | | |
|---|---|---|---|---|---|
| | Type | Average Particle Diameter ($\mu$m) | Content (Part) | Abrasion Resistance | Scratch Resistance |
| Example 1 | $CaCO_3$ | 0.6 | 0.35 | Grade 1 | Grade 2 |
| Example 2 | $CaCO_3$ | 0.6 | 0.35 | Grade 1 | Grade 2 |
| Example 3 | $CaCO_3$ | 0.6 | 0.35 | Grade 1 | Grade 1 |
| Example 4 | $CaCO_3$ | 0.6 | 0.35 | Grade 1 | Grade 1 |
| Example 5 | $CaCO_3$ | 0.6 | 0.60 | Grade 1 | Grade 2 |
| Example 6 | $CaCO_3$ | 0.6 | 0.60 | Grade 1 | Grade 2 |
| Example 7 | $CaCO_3$ | 0.6 | 0.60 | Grade 1 | Grade 1 |
| Example 8 | $CaCO_3$ | 0.6 | 0.60 | Grade 1 | Grade 1 |
| Example 9 | $CaCO_3$ | 0.6 | 0.35 | Grade 1 | Grade 2 |
| Comparative Example 1 | $CaCO_3$ | 0.6 | 0.35 | Grade 3 | Grade 5 |
| Comparative Example 2 | $CaCO_3$ | 0.6 | 0.35 | Grade 2 | Grade 4 |
| Comparative Example 3 | $CaCO_3$ | 0.6 | 0.60 | Grade 3 | Grade 5 |
| Comparative Example 4 | $CaCO_3$ | 0.6 | 0.60 | Grade 2 | Grade 4 |

As described above, the polyester film comprising surface-modified aluminum silicate particles and additional particles distinct in particle diameter according to the present invention has excellent abrasion resistance and scratch resistance and is suitable for magnetic recording media.

What is claimed is:

1. A polyester resin composition comprising, on the basis of about 100 parts by weight of polyester resin, about 0.01 to 5 parts by weight of aluminum silicate particles having an average particle diameter of about 0.01 to 2.0 $\mu$m, said aluminum silicate particles consisting essentially of aluminum, silica, and alkali metal ions, with the mole ratio of silica to aluminum in the range from about 0.25 to 10, and the mole ratio of aluminum to alkali metal ions in the range from about 1.0 to 2.0, said aluminum silicate particles having a core-shell structure formed from grain growth using a seed grain as a nucleus, said core-shell structure having a weight ratio of core to shell in the range from about 0.25 to 10.

2. A film prepared from the polyester resin composition according to claim 1.

3. The polyester resin composition of claim 1, wherein the seed grain is at least one selected from the group consisting of silica, alumina, zirconia, titanium oxide, antimony oxide, indium oxide, cerium oxide and ferric oxide.

4. The polyester resin composition of claim 1, further comprising about 0.05 to 5.0 parts by weight of particles A, having a volume average particle diameter of about 0.005 to 1.0 $\mu$m and a Mohs hardness of more than 5, said particles A selected from the group consisting of silica, spherical silica, titanium oxide, zirconia, alumina, and ferric oxide.

5. The polyester resin composition of claim 4, further comprising, about 0.05 to 5.0 parts by weight of particles B, having a volume average particle diameter of about 0.05 to 2.0 $\mu$m and a Mohs hardness of less than 4, said particles B selected from the group consisting of caolinite, calcium carbonate, barium carbonate, calcium sulfate, barium sulfate, and zinc sulfate.

6. The polyester resin composition of claim 4, further comprising, about 0.05 to 5.0 parts by weight of particles B, having a volume average particle diameter of about 0.05 to 2.0 $\mu$m and a Mohs hardness of less than 4, said particles B being a crosslinked polymer fine particles.

7. The polyester resin composition of claim 1, further comprising about 0.05 to 5.0 parts by weight of particles B, having a volume average particle diameter of about 0.05 to 2.0 μm and a Mohs hardness of less than 4, said particles B selected from the group consisting of caolinite, calcium carbonate, barium carbonate, calcium sulfate, barium sulfate, and zinc sulfate.

8. The polyester resin composition of claim 1, further comprising about 0.05 to 5.0 parts by weight of particles B, having a volume average particle diameter of about 0.05 to 2.0 μm and a Mohs hardness of less than 4, said particles B being a crosslinked polymer fine particles.

* * * * *